Patented Mar. 13, 1923.

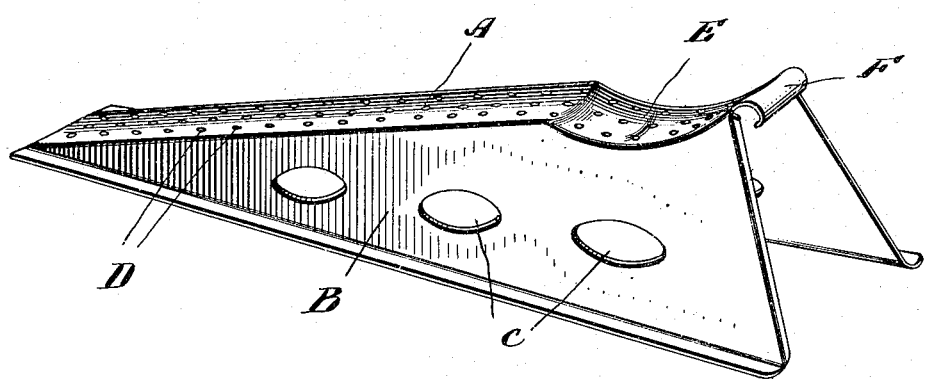
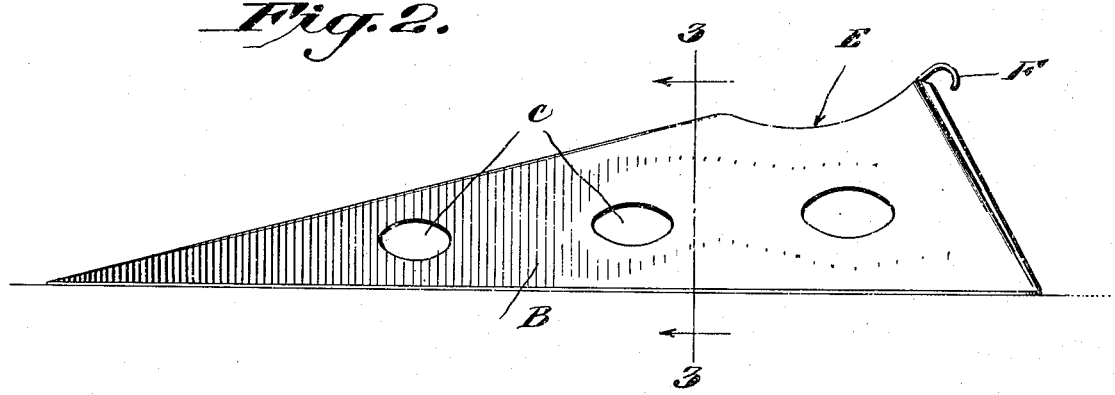
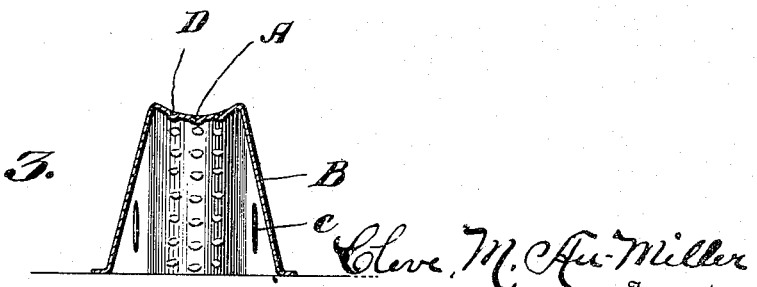

1,448,250

UNITED STATES PATENT OFFICE.

CLEVE M. AU-MILLER, OF MIFFLINBURG, PENNSYLVANIA, ASSIGNOR OF ONE-HALF TO W. E. SHAFFER, OF MIFFLINBURG, PENNSYLVANIA.

VEHICLE ELEVATOR.

Application filed February 24, 1921. Serial No. 447,535.

*To all whom it may concern:*

Be it known that I, CLEVE M. AU-MILLER, a citizen of the United States, residing at Mifflinburg, in the county of Union and State of Pennsylvania, have invented certain new and useful Improvements in Vehicle Elevators, of which the following is a specification.

The object of this invention is to provide a quick and safe method for lifting any, or simultaneously, all wheels of a vehicle, without the necessity of employing lifting screws, ratchets, or other mechanically actuated devices, which may be used to raise and securely hold the vehicle at a height convenient for inspection or repair, yet from which such vehicle may at will be instantly removed.

Another object is to provide means for utilizing the power of self-propelled vehicles to assist in lifting and removing the same from the elevating device.

Another object is to obviate the danger of injury to the vehicle from scarring and damage by lifting devices applied to the vehicle frame; and the final object is to provide a device which applied according to the method hereinafter described will be efficient in operation, yet simple and impossible to get out of order.

The invention consists, first, in the following method, substantially as here described:

An inclined plane, supporting a deeply depressed track, being placed on the ground before each wheel of a vehicle intended to be lifted, the thin edge toward the wheel, the vehicle is pushed or driven up the track ascending the incline until a semi-circular stopping point is reached, into which the wheel settles, holding the wheel securely until the operator desires to remove the same by reversing the vehicle movement. To provide traction for the vehicle while ascending the plane, the track itself is to have grip for the wheel, and to be fitted as a guide to prevent side slip.

The invention includes, second, a device, the use of which depends upon the method above described and is inseparable therefrom, and which is shown in connection with the attached drawings, as follows:

In the drawings, Figure 1 is a perspective of the device, showing its general construction; Figure 2, a side elevation, and Figure 3 a cross-section made at a point upon the incline close to the syncline into the stopping-point, or basin for the vehicle wheel.

As shown by these drawings, the device consists of a single tool, in form an incline plane whose supporting sides, shown as B, are seen in Figure 3 to be flared outwardly from the top, terminating in a foot, or rail to rest upon the ground. Upon this inclined plane, ascending it, is a deeply depressed track, marked A, which is fitted with bosses, frets or depressions, indicated by D, designed so as to give a maximum of traction to vehicles moving thereover. At the point E this depressed track ends in a semi-circular or semi-elliptical basin, or stopping point, the outer end of which, marked F, is slightly higher, serving as a socket, or stop, to prevent further movement of the vehicle after ascending the plane. The sides of the device are pierced with handholes, designed to combine lightness, ready movement, and undiminished strength, marked C; such marks referring to all figures where shown. The sides of the frame are so flared as to resist any tendency to rock from side to side under transverse strains; and the depressed track is designed so as to restrain the tire of the vehicle being elevated from any tendency to slip off sideways, as shown in Figure 1.

What I regard as new, and desire to secure by Letters Patent, is—

1. A vehicle elevator comprising a member adapted to be positioned before a wheel of the vehicle intended to be lifted and presenting an arched frame having an inclined top, forming a wheel-track, and supporting sides flaring outwardly from the top and flanged longitudinally of their respective lower edges to provide ground-engaging feet or rails, the said frame having its rear end projected upwardly and outwardly beyond the said sides and the said top to provide a wheel-stop at the upper end of the track.

2. A vehicle elevator comprising a lifting member for placement before a wheel of the vehicle intended to be lifted and presenting an arched frame having an inclined surface forming a wheel-track and supporting sides forming ground-engaging elements, the said sides flaring outwardly and rearwardly of the said inclined surface to provide a stable base and being pierced with hand-holes to facilitate moving the member.

CLEVE M. AU-MILLER.